USO08528028B2

(12) United States Patent
Sheth et al.

(10) Patent No.: US 8,528,028 B2
(45) Date of Patent: Sep. 3, 2013

(54) SYSTEM AND METHOD OF DELIVERING PERSONAL VIDEO CONTENT

(75) Inventors: Niral Sheth, Austin, TX (US); Arshad Khan, Austin, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1107 days.

(21) Appl. No.: 11/924,151

(22) Filed: Oct. 25, 2007

(65) Prior Publication Data
US 2009/0113472 A1    Apr. 30, 2009

(51) Int. Cl.
*H04N 7/173*    (2011.01)
*H04N 7/16*    (2011.01)

(52) U.S. Cl.
USPC .............. 725/91; 725/110; 725/133; 725/141; 725/153

(58) Field of Classification Search
USPC .............. 725/34, 48, 109–110, 133, 141, 153, 725/91
See application file for complete search history.

(56) References Cited

U.S. PATENT DOCUMENTS

| | | | | |
|---|---|---|---|---|
| 5,664,046 A * | 9/1997 | Abecassis | ........................ | 725/28 |
| 6,774,926 B1 * | 8/2004 | Ellis et al. | ....................... | 725/133 |
| 7,103,905 B2 * | 9/2006 | Novak | .............................. | 725/46 |
| 2002/0056119 A1 | 5/2002 | Moynihan | ........................ | 725/87 |
| 2002/0194194 A1 * | 12/2002 | Fenton et al. | ............... | 707/104.1 |
| 2003/0009766 A1 * | 1/2003 | Marolda | ........................... | 725/88 |
| 2003/0061206 A1 * | 3/2003 | Qian | ................................ | 707/3 |
| 2003/0192049 A1 * | 10/2003 | Schneider et al. | .............. | 725/61 |
| 2004/0117836 A1 | 6/2004 | Karaoguz et al. | | |
| 2005/0246757 A1 | 11/2005 | Relan et al. | | |
| 2005/0262526 A1 * | 11/2005 | Lindenberg | ..................... | 725/25 |
| 2006/0123455 A1 * | 6/2006 | Pai et al. | ........................ | 725/133 |
| 2006/0190966 A1 * | 8/2006 | McKissick et al. | ............. | 725/61 |
| 2006/0259469 A1 * | 11/2006 | Chiu | ................................. | 707/3 |
| 2007/0220553 A1 | 9/2007 | Branam et al. | | |
| 2007/0283385 A1 * | 12/2007 | Qiu et al. | ......................... | 725/34 |
| 2008/0091796 A1 * | 4/2008 | Story et al. | .................... | 709/217 |

OTHER PUBLICATIONS

Bernard Ku, System and Method of Delivering Video Content, U.S. Appl. No. 11/823,276, filed Jun. 26, 2007.
Edward Walter, System and Method of Sharing Private Content, U.S. Appl. No. 11/476,927, filed Jun. 28, 2006.

* cited by examiner

*Primary Examiner* — Pankaj Kumar
*Assistant Examiner* — Randy Flynn
(74) *Attorney, Agent, or Firm* — Toler Law Group, PC (57) ABSTRACT

A method of delivering personal video content via a video head-end office is provided that includes receiving a personal video content upload request at a notification server from a first set-top box device. The personal video content upload request relates to personal video content to be uploaded from the first set-top box device. The method also includes receiving a personal video content sharing request at the notification server from the first set-top box device. The personal video content sharing request identifies a second set-top box device designated to receive the uploaded personal video content. In addition, the method includes sending notification information from the notification server to the second set-top box device. The notification information indicates a first option to store the uploaded personal video content at a data storage device and a second option to stream the uploaded personal video content to the second set-top box device upon selection of the second option.

24 Claims, 7 Drawing Sheets

SYSTEM AND METHOD OF DELIVERING PERSONAL VIDEO CONTENT

FIELD OF THE DISCLOSURE

The present disclosure is generally related to systems and methods of delivering personal video content.

BACKGROUND

Television viewing is part of daily life for many people. Television service providers are typically limited to delivering video content to subscribers that has been made available for public distribution by a television network, a movie studio, or entertainment company. As a result, television viewers are often limited in their opportunities to share personal video content with friends and family via a television service provider network. Hence, there is a need for an improved system and method of delivering personal video content.

DETAILED DESCRIPTION OF THE DRAWINGS

A system to deliver personal video content is disclosed that includes a notification server that includes processing logic and memory accessible to the processing logic. The memory includes instructions executable by the processing logic to send notification information to a first set-top box device. The notification information relates to a graphical user interface indicating that a subscriber associated with a second set-top box device has made personal video content stored at a network storage device available to at least one subscriber associated with the first set-top box device and indicating a plurality of delivery options related to the personal video content. The personal video content is stored at a portion of the network storage device allocated to the second set-top box device. The memory also includes instructions executable by the processing logic to receive delivery preference data from the first set-top box device. The delivery preference data indicates a selection of a delivery option related to downloading the personal video content to a digital video recorder (DVR) associated with the first set-top box device at a specified time or the delivery preference data indicates a selection of a delivery option related to storing the personal video content at a portion of the network storage device allocated to the first set-top box device.

In another embodiment, a set-top box device is disclosed that includes processing logic and memory accessible to the processing logic. The memory includes instructions executable by the processing logic to retrieve personal video content from an electronics device that is external to the set-top box device. The memory also includes instructions executable by the processing logic to send a personal video content upload request to a notification server. The personal video content upload request is related to storing the retrieved personal video content at a network storage device. In addition, the memory includes instructions executable by the processing logic to receive confirmation information from the notification server. The confirmation information indicates that the retrieved personal video content is approved to be stored at the network storage device. Further, the memory includes instructions executable by the processing logic to send the retrieved personal video content to the network storage device after receiving the confirmation information.

In another embodiment, a set-top box device is disclosed that includes processing logic and memory accessible to the processing logic. The memory includes instructions executable by the processing logic to receive notification information from a notification server of an Internet Protocol Television (IPTV) network. The notification information indicates that a first subscriber associated with the set-top box device has been invited to view personal video content of a subscriber associated with an additional set-top box device, at least one first option to store the personal video content at a data storage device associated with the set-top box device, and at least one second option to stream the personal video content to the set-top box device in response to a selection of the at least one second option. The memory also includes instructions executable by the processing logic to send delivery preference data to the notification server related to a selection of the at least one first option or a selection of the at least one second option. In addition, the memory includes instructions executable by the processing logic to receive the personal video content according to the selection of the at least one first option or according to the selection of the at least one second option.

In another embodiment, a method of delivering personal video content via a video head-end office is disclosed that includes receiving a personal video content upload request at a notification server from a first set-top box device. The personal video content upload request relates to personal video content to be uploaded from the first set-top box device. The method also includes receiving a personal video content sharing request at the notification server from the first set-top box device. The personal video content sharing request identifies a second set-top box device designated to receive the uploaded personal video content. In addition, the method includes sending notification information from the notification server to the second set-top box device. The notification information indicates a first option to store the uploaded personal video content at a data storage device and a second option to stream the uploaded personal video content to the second set-top box device upon selection of the second option.

In another embodiment, a method of delivering personal video content via a set-top box device is disclosed that includes retrieving personal video content at the set-top box device from an electronics device that is external to the set-top box device. The method also includes sending a personal video content upload request from the set-top box device to a notification server of an Internet Protocol Television (IPTV) network. The personal video content upload request is related to storing the retrieved personal video content at a data storage device of a personal media library system of the IPTV network. In addition, the method includes receiving confirmation information at the set-top box device from the notification server when an account associated with the set-top box device includes a valid subscription to a personal media content sharing service. The confirmation information indicates that the retrieved personal video content is approved to be stored at the data storage device of the personal media library system. Further, the method includes sending the retrieved personal video content from the set-top box device to the data storage device of the personal media library system after receiving the confirmation information.

Figure 1:
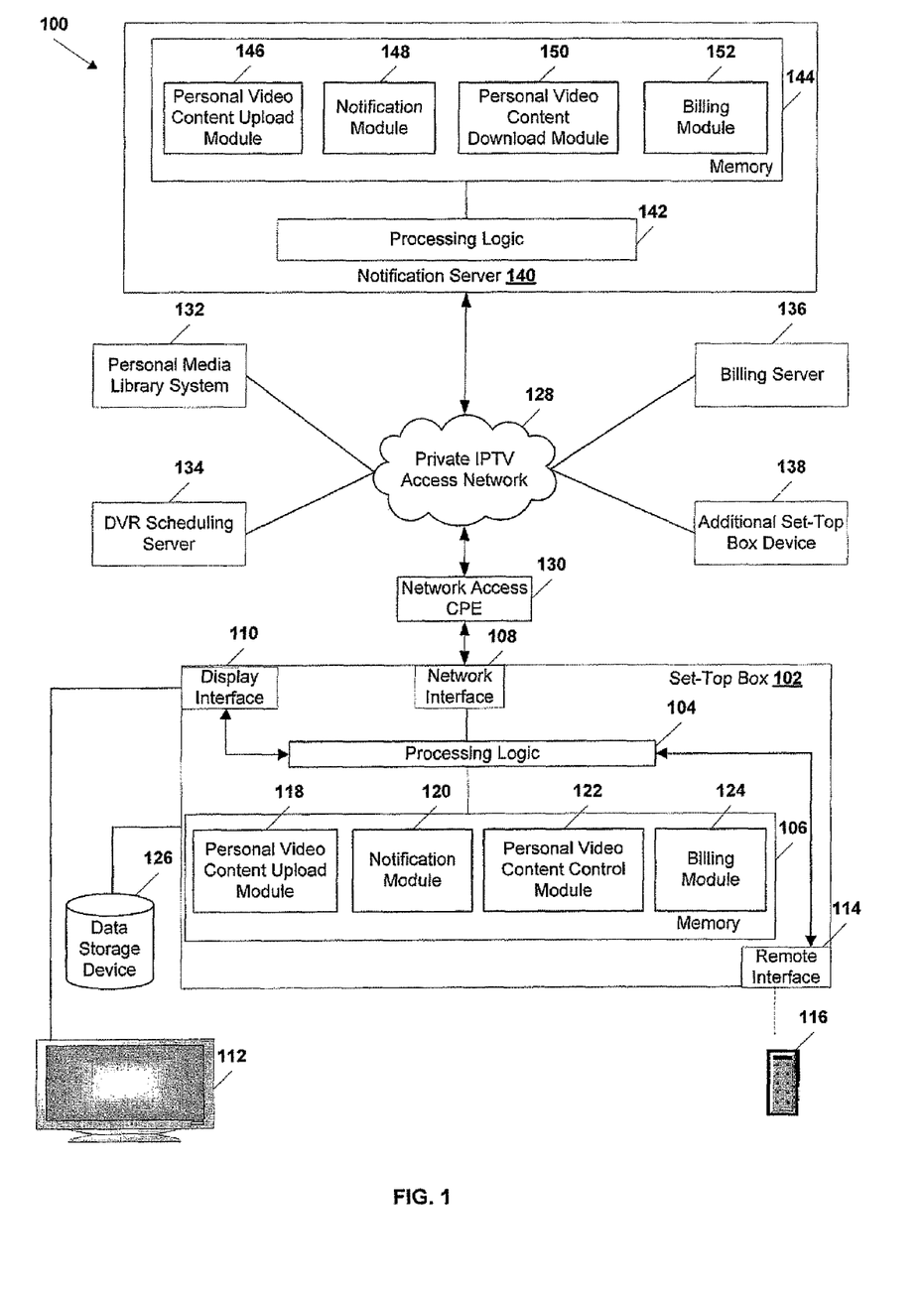
FIG. 1 is a block diagram of a particular embodiment of a system to deliver personal video content.

FIG. 1 is a block diagram illustrating an embodiment of a system 100 to deliver personal video content. The system 100 includes a set-top box device 102 that communicates with a server, such as the notification server 140, via a communications provider network, such as the private Internet Protocol Television (IPTV) access network 128. The set-top box device 102 and the notification server 140 may communicate with a personal media library system 132, a digital video recorder (DVR) scheduling server 134, a billing server 136, an additional set-top box device 138, or any combination thereof, via the private IPTV access network 128. The notification server 140, the personal media library system 132, the DVR scheduling server 134, the billing server 136, or any combination thereof, may be included in a video head-end office, a super head-end office, a national head-end office, a regional head-end office, a local head-end office, or any combination thereof.

In a particular embodiment, the personal media library system 132 includes one or more servers and a network storage device (not shown). The network storage device may include an array of data storage devices. The personal media library system 132 may be adapted to control the storage and delivery of personal media content at the network storage device, such as video content, audio content, and digital photograph content, that is received from the set-top box device 102, the additional set-top box device 138, or any combination thereof. In an illustrative embodiment, the set-top box device 102 and the additional set-top box device 138 may be allocated a specified amount of storage space at the network storage device of the personal media library system 132 based on a subscription to a personal video content sharing service associated with the set-top box device 102 or the additional set-top box device 138. For example, the set-top box device 102 may be associated with a first personal media content sharing service subscription that reserves a first amount of memory at the network storage device and the additional set-top box device 138 may be associated with a second personal media content sharing service subscription that reserves a second amount of memory at the network storage device. The first personal media content sharing service subscription may be associated with reserving a larger amount of memory at the network storage device of the personal media library system 132 than the second personal media content sharing service subscription.

The DVR scheduling server 134 may be adapted to control the downloading of video content to a data storage device associated with the set-top box device 102, such as a DVR, a data storage device associated with the additional set-top box device 138, or any combination thereof. In a particular embodiment, the DVR scheduling server 134 is adapted to receive requests to download personal video content from the network storage device of the personal media library system 132 to the set-top box device 102, to the additional set-top box device 138, or any combination thereof. Additionally, the DVR scheduling server 134 may be adapted to send instructions to the personal media library system 132 to send personal video content to the set-top box device 102 or to the additional set-top box device 138, at a time specified by a personal video content download request that is received from the set-top box device 102 or from the additional set-top box device 138. Further, the DVR scheduling server 134 may be adapted to send data to the notification server 140 related to sending instructions to the set-top box device 102 or the additional set-top box device 138 to record personal video content streaming from the personal media library system 132 at a data storage device associated with the set-top box device 102 or the additional set-top box device 138.

The billing server 136 may be adapted to manage accounts of subscribers that are associated with a personal media content sharing service subscription. For example, the billing server 136 may be adapted to initiate and terminate a personal media content sharing service subscription associated with the set-top box device 102, the additional set-top box device 138, or any combination thereof. In addition, the billing server 136 may be adapted to process charges to an account associated with the set-top box device 102 and the additional set-top box device 138 based on uploading personal video content to the personal media library system 132, downloading personal video content from the personal media library system 132, or any combination thereof. The amount of a particular charge may depend on an amount of data associated with an uploaded or downloaded personal video content file.

The set-top box device 102 includes processing logic 104 and a memory 106 accessible to the processing logic 104. The processing logic 104 can communicate video content to a display device 112 via a display interface 110. In addition, the processing logic 104 may communicate with a remote control device 116 via a remote interface 114. The set-top box device 102 may also communicate with a data storage device, such as the data storage device 126. The data storage device 126 may be coupled to or integrated with the set-top box device 102. In an illustrative, non-limiting embodiment, the data storage device 126 may be a digital video recorder (DVR).

In a particular embodiment, the processing logic 104 may communicate with the private IPTV access network 128 via a network interface 108. In an illustrative, non-limiting embodiment, a customer premises equipment (CPE) 130 may facilitate communication between the network interface 108 and the private IPTV access network 128. The CPE 130 may include a router, a local area network device, a modem, such as a digital subscriber line (DSL) modem or a cable modem, a residential gateway, any other suitable device for facilitating communication between the network interface 108 of the set-top box device 102 and the private IPTV access network 128, or any combination thereof.

In a particular embodiment, the memory 106 includes a personal video content upload module 118 that is executable by the processing logic 104 to receive data indicating a request to upload personal video content to the personal media library system 132. For example, the personal video content upload module 118 may be executable by the processing logic 104 to receive data associated with a selection of an icon included in a graphical user interface related to uploading personal video content. The personal video content may include home movies, independent films that are not available via a movie distribution entity, fan films, animation, other personal video content, or any combination thereof.

After receiving data indicating a request to upload personal video content, the personal video content upload module 118 may be executable by the processing logic 104 to retrieve personal video content from an electronics device that is external to the set-top box device 102. The electronics device may include, for example, a digital camera, a digital video camcorder, a personal computer, a laptop computer, a digital video camera, a hand-held personal computing device, or a mobile handset. In an illustrative embodiment, the personal video content upload module 118 may be executable by the processing logic 104 to retrieve personal video content from the electronics device when the set-top box device 102 is physically coupled to the electronics device. For example, the set-top box device 102 may be physically coupled to the electronics device via a Universal Serial Bus (USB) cable. In another example, the set-top box device 102 may be physically coupled to the electronics device via an Ethernet cable or a coaxial cable, such as an Ethernet cable or a coaxial cable of a local network or a home network. Further, the personal video content upload module 118 may be executable by the processing logic 104 to retrieve personal video content from a memory stick inserted into a corresponding slot of the set-top box device 102. Additionally, the personal video content upload module 118 may be executable by the processing logic 104 to retrieve personal video content from an electronics device via a wireless connection.

After the set-top box device 102 has retrieved personal video content, the personal video content upload module 118 may be executable by the processing logic 104 to send a personal video content upload request to the notification server 140. The personal video content upload request may relate to uploading the retrieved personal video content to a data storage device of the personal media library system 132. The personal video content upload module 118 may be executable by the processing logic 104 to receive confirmation information from the notification server 140 in response to sending the personal video content upload request. The confirmation information may indicate that the retrieved personal video content is approved to be stored at a data storage device of the personal media library system 132. In an illustrative embodiment, the set-top box device 102 receives the confirmation information from the notification server 140 when an account associated with the set-top box device 102 includes a valid subscription to a personal media content sharing service. After receiving confirmation information from the notification server 140, the personal video content upload module 118 may be executable by the processing logic 104 to send the retrieved personal video content to the personal media library system 132. In an illustrative, non-limiting embodiment, the confirmation information may be included in a graphical user interface provided to the display device 112.

The personal video content upload module 118 may also be executable by the processing logic 104 to receive rejection information from the notification server 140 in response to sending the personal video content upload request. The rejection information may be included in a graphical user interface provided to the display device 112. The set-top box device 102 may receive the rejection information from the notification server 140 when the account associated with the set-top box device 102 is not associated with a valid subscription to a personal media content sharing service. For example, a subscriber associated with the set-top box device 102 may not have initiated a subscription to a personal media content sharing service or the subscription may have expired. In another example, the set-top box device 102 may receive rejection information when an account associated with the set-top box device 102 does not have sufficient funds to cover a charge for uploading the personal video content to the personal media library system 132. Additionally, the set-top box device 102 may receive rejection information when an amount of data associated with the personal video content upload request is above a specified threshold. Further, the set-top box device 102 may receive rejection information when an amount of memory reserved for the set-top box device 102 at the network storage device of the personal media library system 132 is full. In response to receiving the rejection information, the personal video content upload module 118 may be executable by the processing logic 104 to provide a graphical user interface to the display device 112 that includes an option to initiate a subscription to a personal media content sharing service, to authorize a charge to the account associated with the set-top box device 102 to complete the personal video content upload request, or any combination thereof.

The personal video content upload module 118 may also be executable by the processing logic 104 to send a personal video content sharing request to the notification server 140. The personal video content sharing request may indicate a recipient for personal video content that has been uploaded to a data storage device of a personal media library system 132 by a subscriber of the set-top box device 102. In an illustrative embodiment, the personal video content upload module 118 may be executable by the processing logic 104 to provide a personal video content recipient graphical user interface (GUI) including a "Buddy List" of friends, family, or any combination thereof, associated with a subscriber of the set-top box device 102. The personal video content recipient GUI may allow the subscriber of the set-top box device 102 to designate members of the "Buddy List" to receive uploaded personal video content.

The personal video content recipient GUI may be provided to the display device 112 as one of a number of graphical user interfaces that are adapted to generate a personal video content upload request. Alternatively, the personal video content recipient GUI may be provided to the display device 112 after confirmation information has been received and the personal video content has been stored at the data storage device of the personal media library system 132. The personal video content recipient GUI may also be adapted to produce a message for a recipient of personal video content, such as, "I hope that you enjoy this video of my vacation." In an illustrative, non-limiting embodiment, the personal video content recipient GUI may provide an option to associate a personal video content file with a parental control rating to restrict access to the personal video content file.

In a particular embodiment, the memory 106 includes a notification module 120 that is executable by the processing logic 104 to receive notification information from the notification server 140. In an illustrative embodiment, the notification information may indicate that one or more subscribers associated with the set-top box device 102 have been invited to view personal video content of a subscriber associated with the additional set-top box device 138. In an illustrative, non-limiting embodiment, the notification module 120 may also be executable by the processing logic 104 to provide the notification information to any subscriber logged in via the set-top box device 102 or to only certain subscribers logged in via the set-top box device 102, such as a head of household or a particular recipient designated to receive the personal video content.

The notification information may be related to an email message, an icon, a pop-up window, an audio message, a graphical user interface, or any combination thereof. In an illustrative embodiment, the notification module 120 may be executable by the processing logic 104 to deliver the notification information based on the status of the set-top box device 102. For example, the status of the set-top box device 102 may relate to the set-top box device 102 receiving the notification information during a subscriber login session and the notification information may be presented to the subscriber in a pop-up window or a graphical user interface. In addition, the status of the set-top box device 102 may also relate to receiving the notification information at the set-top box device 102 while other video content is being provided to the display device 112. To illustrate, the notification module 120 may be executable by the processing logic 104 to provide the notification information in a pop-up window or in an overlay during a television viewing session. In addition, the notification module 120 may be executable by the processing logic 104 to play an audio message during a television viewing session or provide an icon to the display device 112 indicating that notification information has been received at the set-top box device 102. Further, if the set-top box device 102 receives the notification information while providing a graphical user interface, such as an electronic program guide (EPG) or a DVR scheduling graphical user interface, to the display device 112, the notification module 120 may be executable by the processing logic 104 to deliver the notification information via an audio message, an overlay, a pop-up window, an icon, or any combination thereof. When the set-top box device is inactive, the notification module 120 may be executable by the processing logic 104 to send an email message to an email account of a subscriber associated with the set-top box device 102, to store the notification information at the data storage device 126 until the set-top box 102 is in an active state, or any combination thereof.

The notification information may indicate at least one first option to store the personal video content at a data storage device, such as the data storage device 126 or a data storage device associated with the personal media library system 132. For example, the at least one first option may relate to storing the personal video content at the data storage device 126 at a specified time after receiving an invitation to view the personal video content. To illustrate, the subscriber associated with the set-top box device 102 receiving the invitation may specify to download the personal video content at 8 p.m. on Tuesday, Oct. 9, 2007. In addition, the at least one first option may relate to downloading the personal video content to the data storage device 126 in response to receiving the invitation to view the personal video content. The subscriber associated with the set-top box device 102 receiving the invitation may then decide to watch the personal video content at that time or at a later time. Further, the at least one first option may relate to storing the personal video content at a portion of a data storage device of the personal media library system 132 allocated to the subscriber associated with the set-top box device 102 receiving the invitation to view the personal video content.

Figure 6:
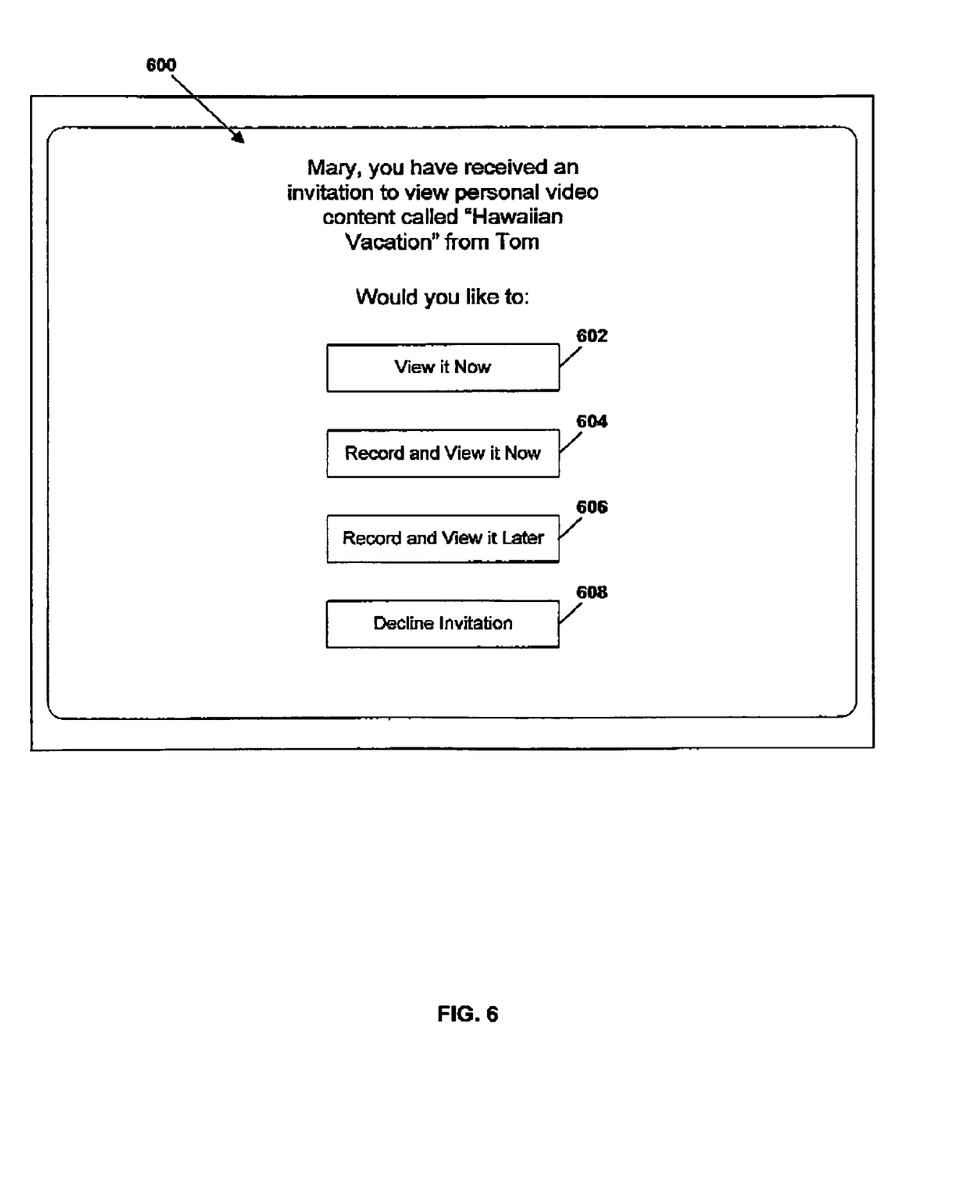
FIG. 6 is a diagram of a second particular embodiment of a graphical user interface to deliver personal video content.

The notification information may also indicate at least one second option to stream the personal video content to the set-top box device 102 in response to a selection of the at least one second option. For example, a notification information GUI may include a "View it Now" option to stream the personal video content to the set-top box device 102 in response to a selection of an icon associated with the "View it Now" option. Additionally, the notification information may indicate at least one third option to decline an invitation to view personal video content. An example of a graphical user interface including at least one first option, at least one second option, and at least one third option is illustrated in FIG. 6.

The notification module 120 may also be executable by the processing logic 104 to send delivery preference data to the notification server 140. The delivery preference data may be related to a selection of the at least one first option, a selection of the at least one second option, or a selection of the at least one third option.

In a particular embodiment, the memory 106 includes a personal video content control module 122 that is executable by the processing logic 104 to manage personal video content received by the set-top box device 102 in response to accepting an invitation to view the personal video content. For example, the personal video content control module 122 may be executable by the processing logic 104 to store the personal video content at the data storage device 126. In another example, the personal video content control module 122 may be executable by the processing logic 104 to provide the personal video content to the display device 112. To illustrate, the personal video content control module 122 may be executable by the processing logic 104 to provide the personal video content to the display device 112 as the personal video content is streaming to the set-top box device 102 from the personal media library system 132. Further, the personal video content control module 122 may be executable by the processing logic 104 to provide personal video content that has been stored at the data storage device 126 to the display device 112.

The personal video content control module 122 may also be executable by the processing logic 104 to prohibit access to personal video content based on a parental control rating associated with the personal video content. In an illustrative embodiment, a subscriber associated with the set-top box device 102 may have received an invitation to view personal video content of a subscriber associated with the additional set-top box device 138 and opted to store the personal video content at the data storage device 126. Whenever any subscriber associated with the set-top box device 102 attempts to view the personal video content, the personal video content control module 122 may be executable by the processing logic 104 to determine if the particular subscriber is authorized to view the personal video content. For example, each subscriber associated with the set-top box device 102 may be assigned a video content access level that identifies the ratings of video content that the respective subscriber is authorized to view. The personal video content control module 122 may be executable by the processing logic 104 to compare the parental control rating assigned to the personal video content with the video content access level of the subscriber to determine if the subscriber is authorized to view the personal video content. When the subscriber is authorized to view the personal video content, the personal video content control module 122 may be executable by the processing logic 104 to provide the personal video content to the display device 112. When the subscriber is not authorized to view the personal video content, the personal video content control module 122 may be executable by the processing logic 104 to provide an error message to the display device 112.

The memory 106 may also include a billing module 124 that is executable by the processing logic 104 to manage transactions related to a personal media content sharing service subscription of a subscriber associated with the set-top box device 102. For example, the billing module 124 may be executable by the processing logic 104 to initiate a subscription to the personal media content sharing service, to terminate a subscription to the personal media content sharing service, or any combination thereof. In addition, the billing module 124 may be executable by the processing logic 104 to provide notice to a subscriber associated with the set-top box device 102 that an account associated with the set-top box device 102 has been charged in relation to transactions related to the personal media content sharing service, such as uploading personal video content to the personal media library system 132 or downloading personal video content from the personal media library system 132.

The notification server 140 may include processing logic 142 and a memory 144 that is accessible to the processing logic 142. In a particular embodiment, the memory 144 includes a personal video content upload module 146 that is executable by the processing logic 142 to receive a personal video content upload request from the set-top box device 102, the additional set-top box device 138, or any combination thereof. For example, the personal video content upload request may be related to personal video content to be uploaded from the set-top box device 102 to a network storage device, such a data storage device of the personal media library system 132. After receiving the personal video content upload request, the personal video content upload module 146 may be executable by the processing logic 142 to receive information from the billing server 136 indicating whether or not an account associated with the set-top box device 102 is associated with a valid personal media content sharing service subscription. When the account associated with the set-top box device 102 is associated with a valid subscription to a personal media content sharing service the personal video content upload module 146 may be executable by the processing logic 142 to send confirmation information to the set-top box device 102. The confirmation information may indicate that the personal video content upload request has been approved. Additionally, the personal video content upload module 146 may be executable by the processing logic 142 to send instructions to the set-top box device 102 to send the personal video content associated with the personal video content upload request to the personal media library system 132 when the personal video content sharing request has been approved. The instructions may be included in the confirmation information or sent separately. Further, when the account associated with the set-top box device 102 is not associated with a valid subscription to a media content sharing service, the video content upload request module 146 may be executable by the processing logic 142 to send rejection information to the set-top box device 102. The rejection information may indicate that the request to upload the personal video content has not been approved.

In an illustrative embodiment, the personal video content upload module 146 is executable by the processing logic 142 to receive a personal video content sharing request from the set-top box device 102 identifying one or more subscribers associated with the additional set-top box device 138 that are designated to receive the personal video content uploaded from the set-top box device 102. The personal video content sharing request may be included with the personal video content upload request or sent after the personal video content upload request has been confirmed. After receiving the personal video content sharing request, the personal video content upload module 146 may be executable by the processing logic 142 to identify the set-top box devices associated with the one or more subscribers designated in the personal video content sharing request.

In a particular embodiment, the memory 144 includes a notification module 148 that is executable by the processing logic 142 to send notification information to the set-top box device 102, the additional set-top box device 138, or any combination thereof. In an illustrative embodiment, the notification information may indicate that a subscriber associated with the additional set-top box device 138 has made personal video content available to at least one subscriber associated with the set-top box device 102. Additionally, the notification information may indicate a plurality of options related to the delivery of personal video content to the set-top box device 102. For example, the personal video content may be stored at a data storage device associated with the personal media library system 132, stored at the data storage device 126, or streamed to the set-top box device 102 from the personal media library system 132.

In an illustrative, non-limiting embodiment, the notification module 148 may be executable by the processing logic 142 to send notification information to the set-top box device 102 when the set-top box device 102 is associated with a valid personal media content sharing service subscription, but to avoid sending the notification information when the set-top box device 102 is not associated with a valid personal media content sharing service subscription. Further, the notification module 148 may be executable by the processing logic 142 to send the notification information to the set-top box device 102 when any subscriber associated with the set-top box device 102 is logged in or only when certain subscribers associated with the set-top box device 102 are logged in. For example, the notification module 148 may be executable by the processing logic 142 to send the notification information to the set-top box device 102 when one or more subscribers designated to receive the personal video content are logged in via the set-top box device 102. In addition, the notification module 148 may be executable by the processing logic 142 to send the notification information to the set-top box device 102 when a subscriber logged in via the set-top box device 102 is authorized to view the personal video content based on a parental control rating assigned to the personal video content.

In a particular embodiment, the memory 144 includes a personal video content download module 150 that is executable by the processing logic 142 to receive delivery preference data from the set-top box device 102, the additional set-top box device 138, or any combination thereof after notification information has been sent to the respective set-top box device. The delivery preference data may indicate one of a plurality of delivery options related to an invitation to view personal video content. The personal video content download module 150 may be executable by the processing logic 142 to send personal video content download data to the DVR scheduling server 134 or the personal media library system 132 based on the delivery preference data.

In an illustrative embodiment, the personal video content download module 150 is executable by the processing logic 142 to send personal video content download data to the DVR scheduling server 134 when the delivery preference data indicates that the personal video content is to be sent to a DVR associated with the set-top box device 102, such as the data storage device 126. For example, the personal video content download data may include instructions to send personal video content that was uploaded from the additional set-top box device 138 and that is stored at the personal media library system 132, to the data storage device 126 at a specified time or in response to receiving the delivery preference data. Further, the personal video content download module 150 may be executable by the processing logic 142 to send personal video content download data to the personal media library system 132 when the delivery preference data indicates that personal video content is to be streamed to the set-top box device 102 without being stored at the data storage device 126. The video content download data may include instructions to stream the uploaded personal video content to the set-top box device 102 in response to receiving the video content download data. In addition, the personal video content download module 150 may be executable by the processing logic 142 to send instructions to the personal media library system 132 to make and store a copy of personal video content at a data storage device associated with the personal media library system 132 after receiving the delivery preference data. The instructions may indicate that the copy of the personal video content is to be stored at a portion of the data storage device of the personal media library system 132 allocated to the set-top box device 102.

Additionally, the personal video content download module 150 may be executable by the processing logic 142 to determine if a subscriber logged in via a set-top box device, such as the set-top box device 102, is authorized to view personal video content upon receiving delivery preference data from the set-top box device 102. The video content download module 150 may be executable by the processing logic 142 to determine if the subscriber logged in via the set-top box device 102 is authorized to view personal video content uploaded from the additional set-top box device 138 based on a parental control rating assigned to the personal video content by a subscriber associated with the additional set-top box device 138. In an illustrative embodiment, the personal video content download module 150 is executable by the processing logic 142 to send instructions to the personal media library system 132 to send the personal video content to the set-top box device 102 when the subscriber logged in via the set-top box device 102 is authorized to view the personal video content. In addition, the personal video content download module 150 may be executable by the processing logic 142 to send an error message to the set-top box device 102 when the subscriber logged in via the set-top box device 102 is not authorized to view the personal video content.

In a particular embodiment, the memory 144 also includes a billing module 152 that is executable by the processing logic 142 to send a request to the billing server 136 related to whether or not the set-top box device 102, the additional set-top box device 138, or any combination thereof, is associated with a valid subscription to a personal media content sharing service after the notification server 140 has received a personal video content upload request. In addition, the billing module 152 may be executable by the processing logic 142 to receive information from the billing server 136 indicating whether or not the set-top box device 102 is associated with a valid subscription to a personal media content sharing service, whether or not the additional set-top box device 138 is associated with a valid subscription to a personal media content sharing service, or any combination thereof.

For ease of explanation, the various modules 118-124 and 146-152 have been described in terms of processor-executable instructions. However, those skilled in the art will appreciate that such modules can be implemented as hardware logic, processor-executable instructions, or any combination thereof. In addition, representative set-top box devices 102 and 138 are depicted, but any number of set-top box devices may be provided.

Figure 2:
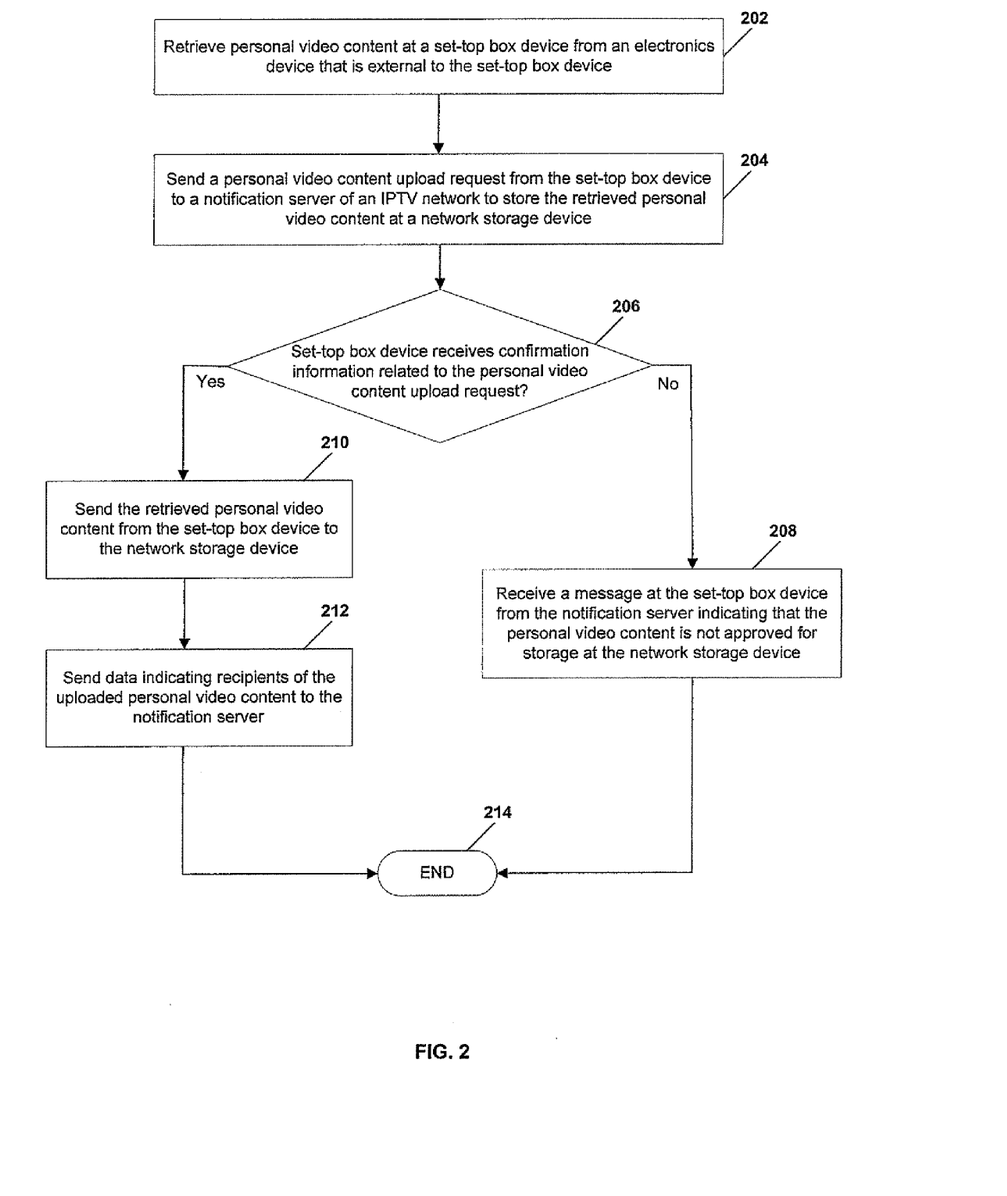
FIG. 2 is a flow diagram of a particular embodiment of a method of delivering personal video content.

FIG. 2 is a flow diagram of a particular embodiment of a method of delivering personal video content. At block 202, personal video content is retrieved at a set-top box device from an electronics device that is external to the set-top box device. In an illustrative embodiment, the set-top box device is the set-top box device 102 of FIG. 1. In an alternative embodiment, the personal video content may be retrieved from the electronics device via a personal computer. For example, a subscriber associated with an Internet Protocol Television (IPTV) network may log into an IPTV network account from a personal computer and retrieve the personal video content from an electronics device that is external to the personal computer, from a memory device of the personal computer, or from a data storage device of a third-party operating a website associated with storing personal video content.

Moving to decision block 204, the set-top box device sends a personal video content upload request to a notification server of the IPTV network. The personal video content upload request is related to storing the retrieved personal video content at a network storage device.

Proceeding to decision block 206, the set-top box device determines if confirmation information related to the personal video content upload request has been received at the set-top box device. The confirmation information indicates that the retrieved personal video content is approved to be stored at a network storage device, such as a data storage device of a personal medial library system of the IPTV network. If the set-top box device does not receive confirmation information, the method proceeds to block 208. At block 208, the set-top box device receives a message from the notification server indicating that the personal video content is not approved for storage at the network storage device. The method proceeds to terminate at 214.

However, if confirmation information has been received at the set-top box device, the method proceeds to block 210. At block 210, the set-top box device sends the retrieved personal video content to the network storage device. Moving to block 212, the set-top box device sends data indicating recipients of the uploaded personal video content to the notification server. The recipients may be designated by a subscriber associated with the set-top box device. In addition, the recipients may be selected from a list of subscribers, such as family and friends, associated with the IPTV network. The method terminates at 214.

Figure 3:
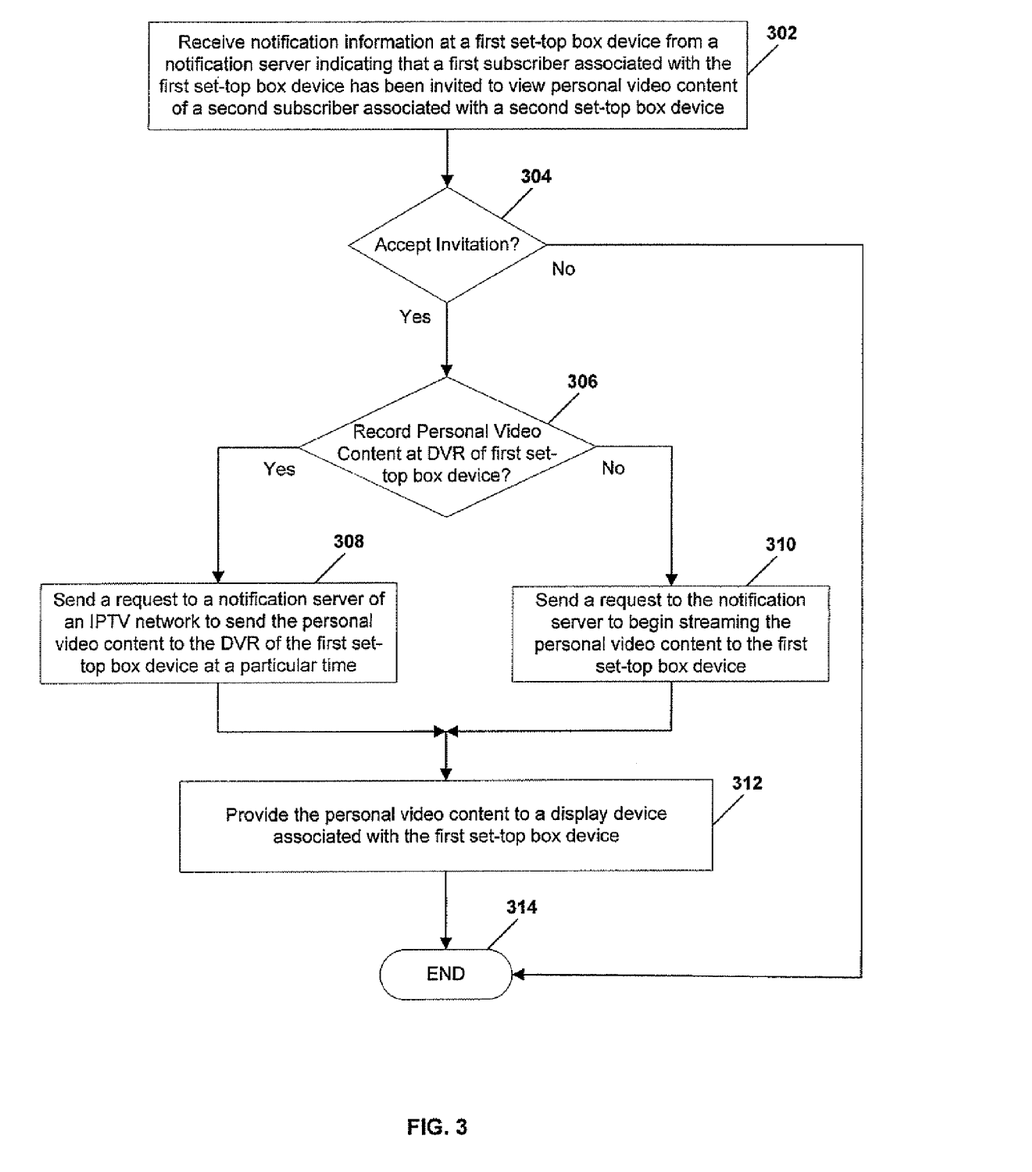
FIG. 3 is a flow diagram of a second particular embodiment of a method of delivering personal video content.

FIG. 3 is a flow diagram of a second particular embodiment of a method of delivering personal video content. At block 302, a first set-top box device receives notification information from a notification server indicating that a first subscriber associated with the first set-top box device has been invited to view personal video content of a second subscriber associated with a second set-top box device. The notification information may indicate a plurality of options related to delivering the personal video content to the first set-top box device. For example, the notification information may be related to a graphical user interface that indicates at least one first option to store the personal video content at a digital video recorder (DVR) of the first set-top box device, at least one second option to stream the personal video content to the first set-top box device without storing the personal video content at the DVR of the first set-top box device, at least one option to decline the invitation to view the personal video content, or any combination thereof.

Moving to decision block 304, the first set-top box device determines if data indicating an option that relates to accepting the invitation to view the personal video content has been received. For example, the first set-top box device may determine if data indicating an option to accept the invitation and to store the personal video content at the DVR of the first set-top box device has been received or if data indicating an option to accept the invitation and to stream the personal video content to the first set-top box device has been received. When the first set-top box device has received data indicating that the invitation to view the personal video content of the second set-top box device has been accepted, the method proceeds to decision block 306. When the first set-top box device has not received data indicating that the invitation to view the personal video content has been accepted, such as receiving information indicating an option to decline the invitation, then the method terminates at 314.

At decision block 306, the first set-top box device determines if data has been received that indicates the selection of an option to record the personal video content of the subscriber of the second set-top box device at the DVR of the first set-top box device. To illustrate, the first set-top box device may receive data indicating that the personal video content is to be stored at the DVR of the first set-fop box device at a specified time. In addition, the first set-top box device may receive data indicating that the personal video content is to be stored at the DVR of the first set-top box device as soon as possible after receiving the invitation. When the first set-top box device receives data indicating the selection of an option to record the personal video content at the DVR of the first set-top box device, the method proceeds to block 308. At block 308, the first set-top box device sends a request to a notification server of an Internet Protocol Television (IPTV) network, such as the notification server 140 of FIG. 1, to send the personal video content to the DVR of the first set-top box device at a particular time. In an illustrative embodiment, the request sent to the notification server may be related to sending the personal video content to the DVR of the first set-top box device at a time indicated by the selected option. The method proceeds to block 312.

When the first set-top box device does not receive data indicating the selection of an option to record the personal video content at the DVR of the first set-top box device, the method proceeds to block 310. At block 310, the first set-top box device sends a request to a notification server of the IPTV network to begin streaming the personal video content of the subscriber of the second set-top box device to the first set-top box device. The method proceeds to block 312.

At block 312, the personal video content of the subscriber of the second set-top box device is provided to a display device associated with the first set-top box device. For example, the personal video content may be provided to the display device from the DVR of the first set-top box device. Additionally, the personal video content may be provided to the display device as the personal video content is streaming to the first set-top box device from a personal media library system, such as the personal media library system 132 of FIG. 1.

Figure 4:
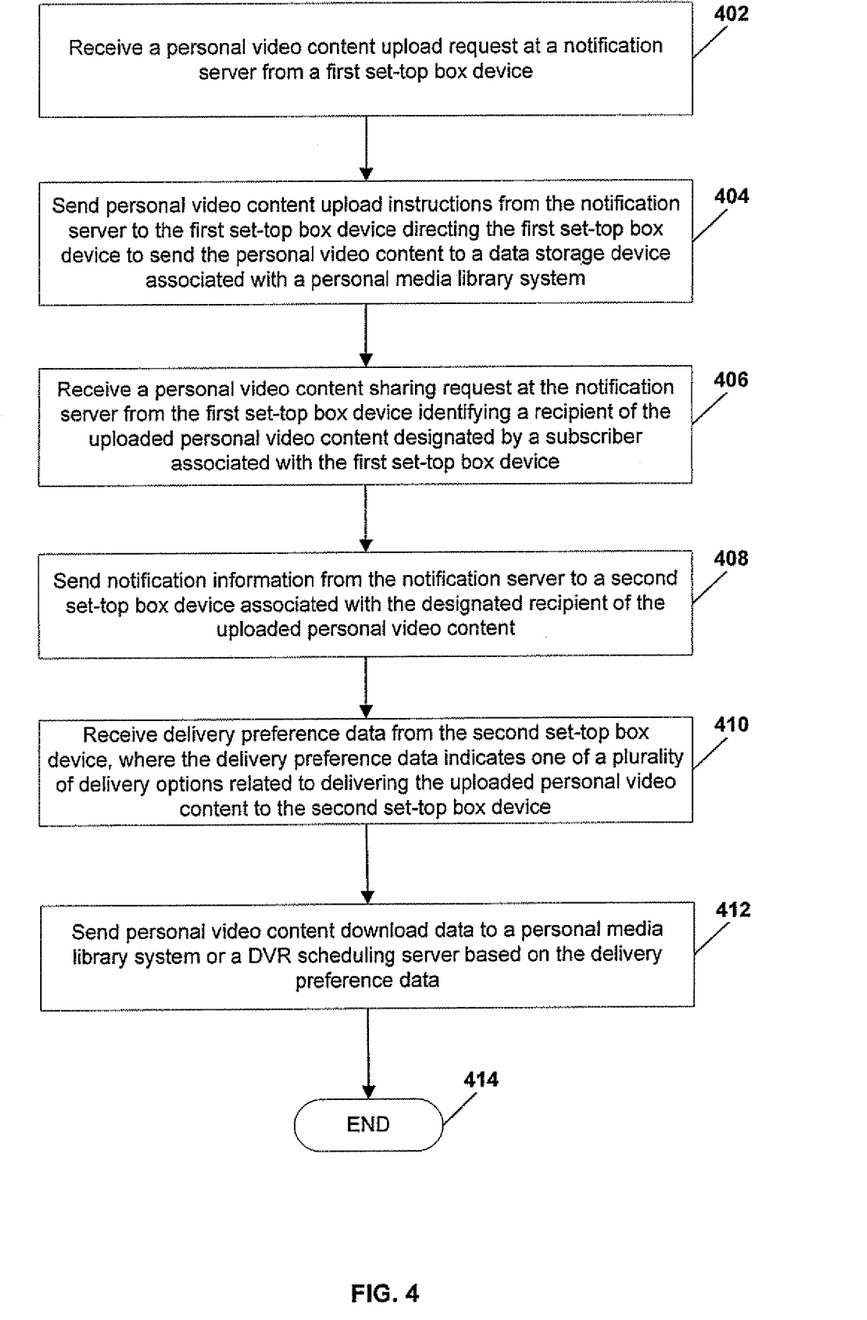
FIG. 4 is a flow diagram of a third particular embodiment of a method of delivering personal video content.

FIG. 4 is a flow diagram of a third particular embodiment of a method of delivering personal video content. At block 402, a personal video content upload request is received at a notification server from a first set-top box device. The personal video content upload request relates to personal video content to be uploaded from the first set-top box device to a network storage device, such as a data storage device of a personal media library system. The first set-top box device may be associated with an Internet Protocol Television (IPTV) network. In an illustrative embodiment, the notification server is the notification server 140 of FIG. 1 and the set-top box device is the set-top box device 102 of FIG. 1.

Moving to block 404, the notification server sends personal video content upload instructions to the first set-top box device directing the first set-top box device to send the personal video content to the network storage device. Proceeding to block 406, the notification server receives a personal video content sharing request from the first set-top box device identifying a recipient of the personal video content designated by a subscriber associated with the first set-top box device. The designated recipient of the personal video content may be a subscriber associated with a second set-top box device of the IPTV network.

At block 408, the notification server sends notification information to the second set-top box device associated with the designated recipient of the uploaded personal video content. Moving to block 410, the notification server receives delivery preference data from the second set-top box device. The delivery preference data indicates one of a plurality of delivery options related to delivering the uploaded personal video content to the second set-top box device. For example, the delivery preference data may indicate that the personal video content is to be stored at a digital video recorder (DVR) of the second set-top box device. In addition, the delivery preference data may indicate that the personal video content is to be streamed to the second set-top box device without being stored at the DVR of the second set-top box device. Proceeding to block 412, the notification server sends personal video content download data to a personal media library system or to a DVR scheduling server based on the delivery preference data. To illustrate, the notification server may send personal video content download data to the personal media library system when the personal video content is to be streamed to the second set-top box device and the notification server may send personal video content download data to the DVR scheduling server when the personal video content is to be stored at the DVR of the second set-top box device. The method terminates at 414.

Figure 5:
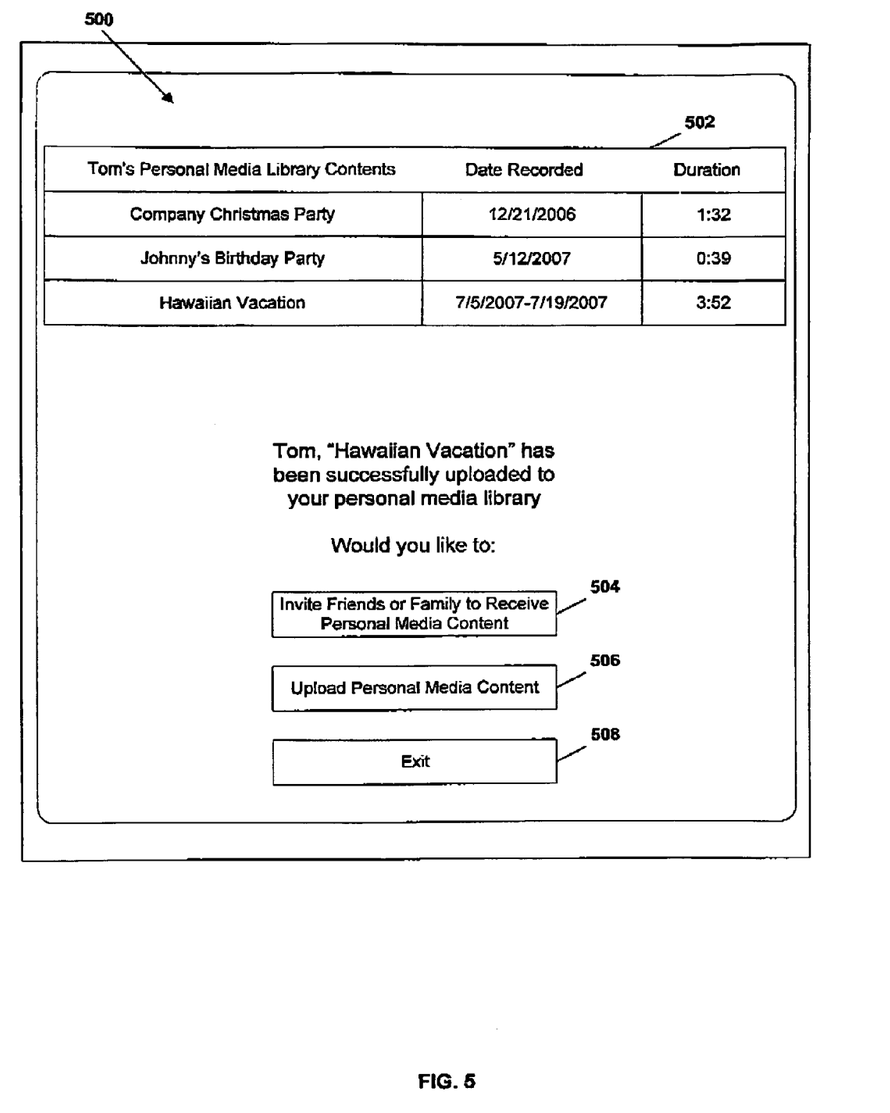
FIG. 5 is a diagram of a particular embodiment of a graphical user interface to deliver personal video content.

FIG. 5 is a diagram of a particular embodiment of a graphical user interface 500 to deliver personal video content. The graphical user interface 500 may be displayed after personal video content has been retrieved from an electronics device or memory stick and uploaded to a personal media library system of a communications service provider network, such as an Internet Protocol Television (IPTV) network. For example, graphical user interface 500 indicates that a subscriber, Tom, associated with a particular set-top box device has uploaded personal video content entitled, "Hawaiian Vacation," to the personal media library system.

The graphical user interface 500 includes a personal media library contents listing 502 that identifies personal media content of the subscriber, Tom, that has been stored at the personal media library system. The personal media content may include personal video content, audio content, digital photograph content, or any combination thereof. The personal media library contents listing 502 also includes dates associated with the stored media content. For example, the personal media library contents listing 502 indicates that personal video content entitled, "Company Christmas Party", recorded on Dec. 21, 2006, and having a duration of one hour, 32 minutes is stored at the personal media library system. In addition, the personal media library contents listing 502 indicates that personal video content entitled, "Johnny's Birthday Party" recorded on May 12, 2007, with a duration of 39 minutes and personal video content entitled "Hawaiian Vacation" recorded between Jul. 5, 2007-Jul. 19, 2007, with a duration of 3 hours and 52 minutes are also stored at the personal media library system. In an illustrative embodiment, the personal media content may be stored at a portion of a network storage device of the personal media library system that has been reserved for the subscriber, Tom, according to a subscription to a personal media content sharing service.

The graphical user interface 500 also includes a number of selectable icons relating to options associated with the uploaded personal media content. In a particular embodiment, the graphical user interface 500 includes an icon 504 related to inviting friends and family of the subscriber, Tom, to receive personal media content. For example, the subscriber, Tom, may want to invite friends or family members to view the personal video content entitled, "Hawaiian Vacation." In an illustrative, non-limiting embodiment, the subscriber, Tom, may select the friends and family to receive the personal media content from a list of subscribers associated with the communications service provider network.

In addition, the graphical user interface 500 may include an icon 506 related to uploading a personal media content item, such as personal video content, to the personal media library system. After the icon 506 has been selected, one or more graphical user interfaces may be provided that guide a subscriber through the process of uploading personal media content to the personal media library system. Further, the graphical user interface 500 includes an icon 508 related to exiting the graphical user interface 500 and proceeding to a different graphical user interface.

FIG. 6 is a diagram of a second particular embodiment of a graphical user interface 600 to deliver personal video content. The graphical user interface 600 includes notification information that is presented via a particular set-top box device when a subscriber associated with another set-top box device has invited the subscriber associated with the particular set-top box device to view personal video content. For example, the graphical user interface 600 indicates that a set-top box device subscriber, Mary, has received an invitation to view personal video content, entitled "Hawaiian Vacation," from another set-top box device subscriber, Tom. The graphical user interface 600 may be presented via the particular set-top box device when any subscriber associated with the particular set-top box device is logged in or only presented when the intended recipient or recipients of the personal video content are logged in.

The graphical user interface 600 presents delivery options to the set-top box device subscriber, Mary, related to the invitation to view personal video content by the subscriber, Tom. An icon 602 gives Mary the option of viewing the personal video content at the current time. The selection of the icon 602 may trigger the subsequent streaming of the personal video content to Mary's set-top box device. An icon 604 gives Mary the option to record the personal video content and view the video content at the current time. To illustrate, the selection of the icon 604 may cause the personal video content to be sent to the DVR of Mary's set-top box device and then provided to a display device coupled to her set-top box device. The stored personal video content would be available for later viewing by Mary or possibly another subscriber associated with her set-top box device.

The graphical user interface 600 also includes an icon 606 that gives Mary the option to record the personal video content and view the personal video content at a later time. For example, the selection of icon 606 may result in another graphical user interface being presented that allows Mary to choose a particular time that she would like to watch the personal video content, such as 8 p.m. on Tuesday, Oct. 9, 2007. The personal video content may be downloaded to a data storage device coupled Mary's set-top box device at the specified time. Graphical user interface 600 also includes an icon 608 related to declining the invitation to view the personal video content from the subscriber, Tom.

According to particular embodiments, personal video content may be shared between set-top box device subscribers of a communications provider network via a network storage device. A set-top box device subscriber receiving an invitation to view personal video content of another set-top box device subscriber is given a number of options to respond to the invitation, including options related to local storage of the personal video content or network storage of the personal video content. The set-top box device subscriber wanting to share personal video content may specify the recipients of the personal video content and may be able to restrict access to the personal video content by assigning a parental control rating to the personal video content.

Figure 7:
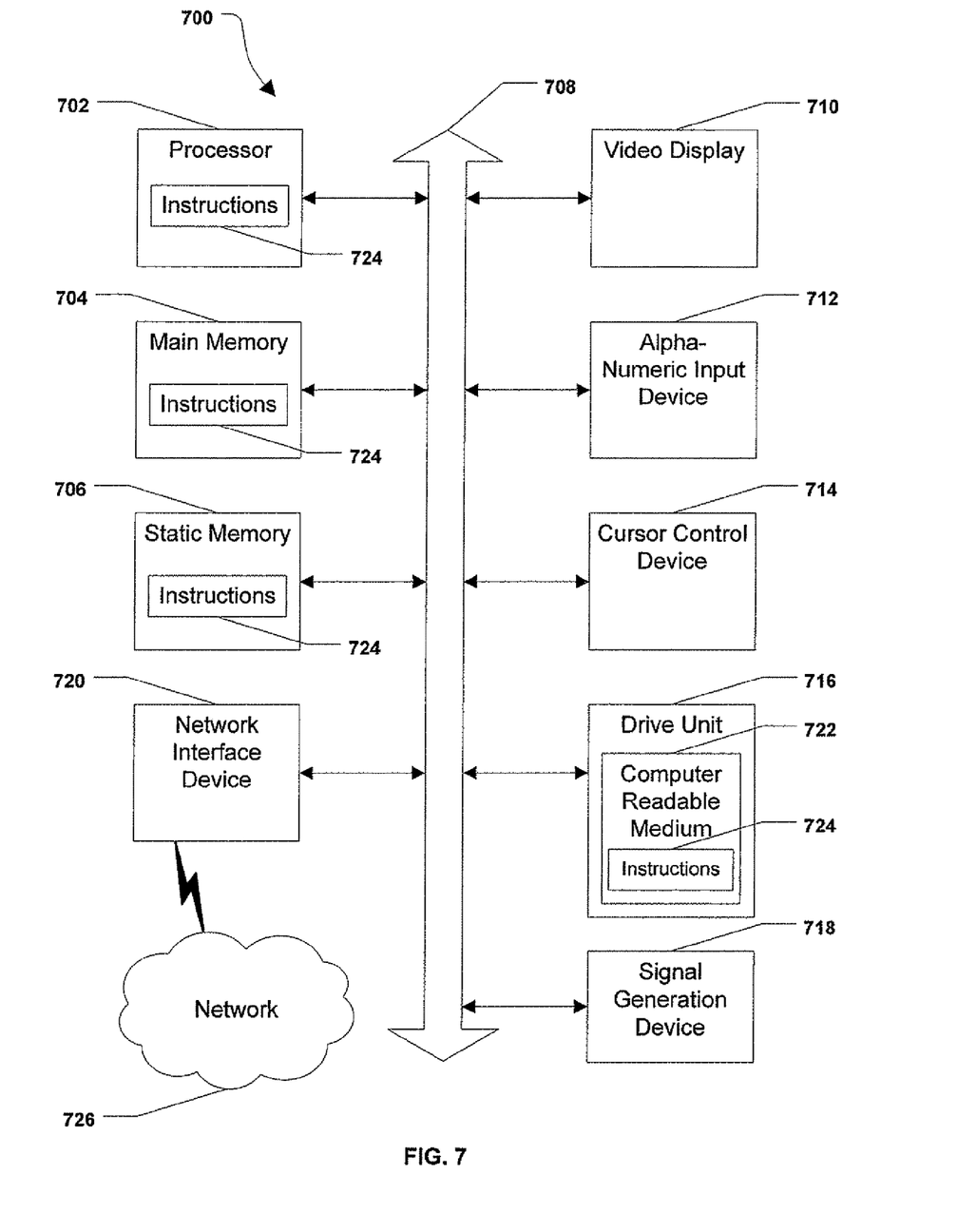
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a notification server, a personal media library system, a DVR scheduling server, a billing server, or set-top box device, as shown in FIG. 1.

In a networked deployment, the computer system may operate in the capacity of an IPTV server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the What is clamed is:

1. A method of delivering personal video content via a video head-end office, the method comprising:
   receiving a personal video content upload request at a notification server from a first set-top box device, the personal video content upload request related to personal video content to be uploaded from the first set-top box device;
   receiving a personal video content sharing request at the notification server from the first set-top box device, the personal video content sharing request identifying a subscriber associated with a second set-top box device designated to receive the uploaded personal video content;
   making a determination, at the notification server, whether the subscriber is logged in via the second set-top box device to determine whether to send notification information to the second set-top box device or to send the notification information to an electronic mail address associated with the subscriber, wherein the notification information provides a first option to store the uploaded personal video content at a data storage device and a second option to stream the uploaded personal video content to the second set-top box device upon selection of the second option;
   sending the notification information from the notification server to the second set-top box device when the subscriber is logged in via the second set-top box device;
   sending the notification information from the notification server to the electronic mail address associated with the subscriber when the subscriber is not logged in via the second set-top box device;
   in response to selection of the first option, receiving delivery preference data at the notification server from the second set-top box device, wherein the delivery preference data includes a delivery time specified by the second set-top box device; and
   in response to selection of the second option, streaming the uploaded personal video content to the second set-top box device, wherein streaming the uploaded personal video content includes displaying a message related to the uploaded personal video content from a sender of the personal video content.

2. The method of claim 1, further comprising sending personal video content upload instructions from the notification server to the first set-top box device, the personal video content upload instructions directing the first set-top box device to send the uploaded personal video content to a personal media library system.

3. The method of claim 2, further comprising sending personal video content download data from the notification server to a digital video recorder scheduling server or to the personal media library system based on the delivery preference data.

4. The method of claim 3, wherein the notification server sends second personal video content download data to the personal media library system, the second personal video content download data including instructions to stream the uploaded personal video content to the second set-top box device in response to receiving the second personal video content download data.

5. The method of claim 1, further comprising receiving information at the notification server from a billing server, wherein the information indicates that the first set-top box device is associated with a valid subscription to a personal media content sharing service, that the second set-top box device is associated with a valid subscription to the personal media content sharing service, or any combination thereof.

6. The method of claim 1, wherein the data storage device is a digital video recorder integrated within the second set-top box device.

7. A method of delivering personal video content via a set-top box device, the method comprising:
   retrieving personal video content at the set-top box device from an electronics device that is external to the set-top box device via a wireless connection;
   sending a personal video content upload request from the set-top box device to a notification server of an Internet Protocol Television network, the personal video content upload request related to storing the personal video content at a data storage device of a personal media library system of the Internet Protocol Television network;
   receiving rejection information from the notification server when a data size of the personal video content exceeds a threshold;
   sending a graphical user interface to enable completion of the personal video content upload request in response to the rejection information;
   receiving confirmation information at the set-top box device from the notification server after the completion of the personal video content upload request, the confirmation information indicating that the personal video content is approved to be stored at the data storage device of the personal media library system; and
   sending the personal video content from the set-top box device to the data storage device of the personal media library system based on the confirmation information.

8. The method of claim 7, further comprising designating a recipient of the personal video content via a list of subscribers associated with the Internet Protocol Television network.

9. The method of claim 8, further comprising sending a message to the recipient when the recipient agrees to receive the personal video content via a response to notification information.

10. The method of claim 7, wherein an account associated with the set-top box device is charged a fee based on an amount of data associated with the personal video content.

11. The method of claim 7, further comprising receiving second rejection information at the set-top box device from the notification server when an account associated with the set-top box device is not associated with a valid subscription to a personal media content sharing service, the second rejection information indicating that the personal video content is not approved to be stored at the data storage device of the personal media library system.

12. The method of claim 7, further comprising providing a personal video content sharing graphical user interface to a display device associated with the set-top box device, the personal video content sharing graphical user interface including a first selectable icon related to inviting one or more subscribers associated with the Internet Protocol Television network to view personal video content, a second selectable icon related to uploading a personal video content file, or any combination thereof.

13. A system to deliver personal video content, the system comprising:
   a notification server including processing logic and memory accessible to the processing logic, the memory including instructions executable by the processing logic to perform operations including:
      determining whether at least one subscriber associated with a first set-top box device is logged in to a network via the first set-top box device to determine whether to send notification information to the first set-top box device or to send the notification information to an electronic mail address associated with the at least one subscriber, wherein the at least one subscriber is to receive notification information about availability of personal video content located in a portion of a network storage device allocated to a second set-top box device, and wherein the notification information indicates a plurality of delivery options related to the personal video content;

sending the notification information to the first set-top box device when the at least one subscriber is logged in via the first set-top box device to the network;

sending the notification information to the electronic mail address associated with the at least one subscriber when the at least one subscriber is not logged in via the first set-top box device to the network; and receiving delivery preference data in response to the notification information, the delivery preference data indicating a selection of a delivery option, wherein the delivery option is one of an option to download the personal video content to a digital video recorder associated with the first set-top box device at a time specified by the first set-top box device, and an option to store the personal video content at a portion of the network storage device allocated to the first set-top box device.

14. The system of claim 13, wherein the first set-top box device is associated with a first personal media content sharing service subscription that reserves a first amount of memory at the network storage device and the second set-top box device is associated with a second personal media content sharing service subscription that reserves a second amount of memory at the network storage device.

15. The system of claim 13, wherein the operations further include:
determining whether a subscriber logged in via the first set-top box device is authorized to view the personal video content based on a parental control rating assigned to the personal video content by a subscriber associated with the second set-top box device; and
sending instructions to a personal media library system to send the personal video content to the first set-top box device when the subscriber logged in via the first set-top box device is authorized to view the personal video content and to send a message from the subscriber associated with the second box to a recipient of the personal video content.

16. The system of claim 15, wherein the operations further include sending an error message to the first set-top box device when the subscriber logged in via the first set-top box device is not authorized to view the personal video content.

17. The system of claim 13, wherein the operations further comprise receiving information at the notification server from a billing server, wherein the information indicates that the first set-top box device is associated with a valid subscription to a personal media content sharing service.

18. The system of claim 13, wherein the operations further comprise receiving information at the notification server from a billing server, wherein the information indicates that the second set-top box device is associated with a valid subscription to a personal media content sharing service.

19. A set-top box device, comprising:
processing logic and memory accessible to the processing logic, the memory including instructions executable by the processing logic to perform operations including:
retrieving personal video content from an electronics device that is external to the set-top box device;
sending a personal video content upload request to a notification server, the personal video content upload request related to storing the personal video content at a network storage device;
receiving rejection information from the notification server when a memory allocation for storage of data by the set-top box device is full;
sending a graphical user interface to enable completion of the personal video content upload request in response to the rejection information;
receiving confirmation information from the notification server that indicates that the personal video content is approved to be stored at the network storage device after completion of the personal video content upload request; and
sending the personal video content to the network storage device based on the confirmation information, wherein the network storage device is configured to deliver the personal video content to a second set-top box device at a time specified by the second set-top box device.

20. The set-top box device of claim 19, wherein the operations further comprise designating a recipient of the personal video content.

21. The set-top box device of claim 20, wherein the operations further include sending a message to the recipient when the recipient agrees to receive the personal video content via a response to notification information.

22. The set-top box device of claim 19, wherein an account associated with the set-top box device is charged a fee based on an amount of data associated with the personal video content.

23. The set-top box device of claim 19, wherein the operations further include receiving second rejection information from the notification server when an account associated with the set-top box is not associated with a valid subscription to a personal media content sharing service.

24. The set-top box device of claim 19, wherein the operations further include providing a personal video content sharing graphical user interface to a display device associated with the set-top box device, wherein the personal video content sharing graphical user interface includes a first selectable icon related to inviting a subscriber to view personal video content, a second selectable icon to upload a personal video content file, or any combination thereof.

* * * * *